(12) United States Patent
Chew

(10) Patent No.: US 10,671,925 B2
(45) Date of Patent: Jun. 2, 2020

(54) CLOUD-ASSISTED PERCEPTUAL COMPUTING ANALYTICS

(71) Applicant: INTEL CORPORATION, Santa Clara, CA (US)

(72) Inventor: Yen Hsiang Chew, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 15/392,360

(22) Filed: Dec. 28, 2016

(65) Prior Publication Data

US 2018/0181868 A1 Jun. 28, 2018

(51) Int. Cl.
| G06F 15/16 | (2006.01) |
| G06N 5/02 | (2006.01) |
| H04L 29/08 | (2006.01) |

(52) U.S. Cl.
CPC .............. *G06N 5/02* (2013.01); *H04L 67/12* (2013.01)

(58) Field of Classification Search
CPC .................................. H04L 67/12; G06N 5/02
See application file for complete search history.

(56) References Cited

U.S. PATENT DOCUMENTS

| 9,443,511 | B2 * | 9/2016 | Hwang | .................... | G10L 15/10 |
| 9,465,388 | B1 * | 10/2016 | Fairfield | ............... | G05D 1/0044 |
| 9,473,514 | B1 * | 10/2016 | Chou | ...................... | H04W 4/70 |
| 9,706,406 | B1 * | 7/2017 | Adams | ................... | H04W 12/08 |
| 10,223,751 | B1 * | 3/2019 | Hutchinson | ............ | G06Q 40/08 |
| 2009/0013177 | A1 |  | 1/2009 | Lee et al. | |
| 2010/0161161 | A1 |  | 6/2010 | Lee et al. | |
| 2010/0188328 | A1 * | 7/2010 | Dodge | ................... | G06F 3/0346 345/156 |
| 2011/0313958 | A1 |  | 12/2011 | Roverso | |
| 2012/0136549 | A1 * | 5/2012 | Bradai | ................... | B60Q 1/085 701/93 |
| 2012/0314901 | A1 * | 12/2012 | Hanson | ................ | A61B 5/0077 382/103 |
| 2013/0238538 | A1 |  | 9/2013 | Cook et al. | |

(Continued)

FOREIGN PATENT DOCUMENTS

| CN | 201523240 A | 6/2012 |
| EP | 3032455 A1 | 12/2014 |
| WO | 2015081063 A1 | 6/2015 |

OTHER PUBLICATIONS

Chew, Yen Hsiang, U.S. Appl. No. 15/474,235, filed in the USPTO Mar. 30, 2017, US Application, Drawings, and E-Ack Receipt attached 54 pages, not yet published.

(Continued)

*Primary Examiner* — Hieu T Hoang
(74) *Attorney, Agent, or Firm* — International IP Law Group, P.L.L.C.

(57) ABSTRACT

A computing device and method for cloud-assisted perceptual computing is described. The computing device includes a sensor to collect data for perceptual computing. The computing device also includes an analytics determiner to calculate a disposition result based on the data collected by the sensor and to calculate a confidence level of the disposition result. The computing device compares the confidence level to a threshold and sends the data to a cloud computing device in response to the confidence level being below the threshold.

33 Claims, 9 Drawing Sheets

(56) References Cited

U.S. PATENT DOCUMENTS

| | | | |
|---|---|---|---|
| 2013/0293217 A1* | 11/2013 | Moiseev | G05B 9/03 324/76.77 |
| 2014/0093131 A1* | 4/2014 | Fan | G06K 9/00671 382/104 |
| 2014/0129178 A1 | 5/2014 | Meduna et al. | |
| 2014/0149060 A1 | 5/2014 | Meduna et al. | |
| 2014/0189069 A1 | 7/2014 | Gero et al. | |
| 2014/0210625 A1* | 7/2014 | Nemat-Nasser | G08B 21/06 340/575 |
| 2014/0237277 A1 | 8/2014 | Mallinson et al. | |
| 2014/0244209 A1 | 8/2014 | Lee et al. | |
| 2014/0247206 A1* | 9/2014 | Grokop | G06F 1/3287 345/156 |
| 2014/0282945 A1* | 9/2014 | Smith | G06F 21/32 726/6 |
| 2014/0354527 A1* | 12/2014 | Chen | G06F 3/017 345/156 |
| 2015/0019620 A1 | 1/2015 | Gidron et al. | |
| 2015/0134460 A1 | 5/2015 | Tian et al. | |
| 2015/0185713 A1 | 7/2015 | Glickfield et al. | |
| 2015/0222477 A1 | 8/2015 | Ranjan et al. | |
| 2015/0317565 A1* | 11/2015 | Li | G06N 5/048 706/52 |
| 2016/0063503 A1* | 3/2016 | Kobres | G06Q 20/20 705/18 |
| 2016/0088206 A1* | 3/2016 | Robinson | G06F 3/038 348/135 |
| 2016/0142868 A1* | 5/2016 | Kulkarni | H01Q 1/24 455/456.5 |
| 2016/0209818 A1 | 7/2016 | Mandle et al. | |
| 2017/0301213 A1* | 10/2017 | Davis | G08B 21/22 |
| 2018/0039956 A1* | 2/2018 | McElhinney | G06N 7/005 |

OTHER PUBLICATIONS

PCT International Search Report, PCT Application No. PCT/US2017/062276, dated May 3, 2018, 3 pages.
PCT International Search Report, PCT Application No. PCT/US2018/019882, dated Jun. 14, 2018, 3 pages.

* cited by examiner

100

300

700

800

CLOUD-ASSISTED PERCEPTUAL COMPUTING ANALYTICS

TECHNICAL FIELD

The present disclosure relates generally to perceptual computing analytics. More specifically, the present techniques relate to perceptual computing analytics assisted by a cloud-hosted analytics determiner.

BACKGROUND ART

Perceptual computing may be the ability of a computer to sense or analyze its environment, including users in that environment, and respond accordingly. Indeed, the computer may be able to determine what needs a user might have. Some perceptual computing applications offer a depth sensor and cameras. Perceptual computing may provide for facial analysis, hand and finger tracking, speech recognition, gesture recognition, body part recognition, posture analysis, scene analysis, object recognition, object measurement, and identification of user features such as eyes, mouth, and nose. Perceptual computing may provide for the computer to gain insights from users that can be applied to applications. Evaluating user emotions may be possible, such as by analyzing facial expression.

Anonymous video analytics (AVA) and image analytics are two types of perceptual computing analytics. AVA gathers metrics about audience engagement with an object or a host computing system such as a digital sign, a kiosk, or merchandise on a shelf. Image analytics is the extraction of meaningful information mainly from digital images using digital image processing techniques.

Furthermore, the Internet of Things (IoT) may bring Internet connectivity to as many as 50 billion devices by 2020. For organizations, IoT devices may provide opportunities for monitoring, tracking, or controlling other devices and items, including further IoT devices, other home and industrial devices, items in manufacturing and food production chains, and the like.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
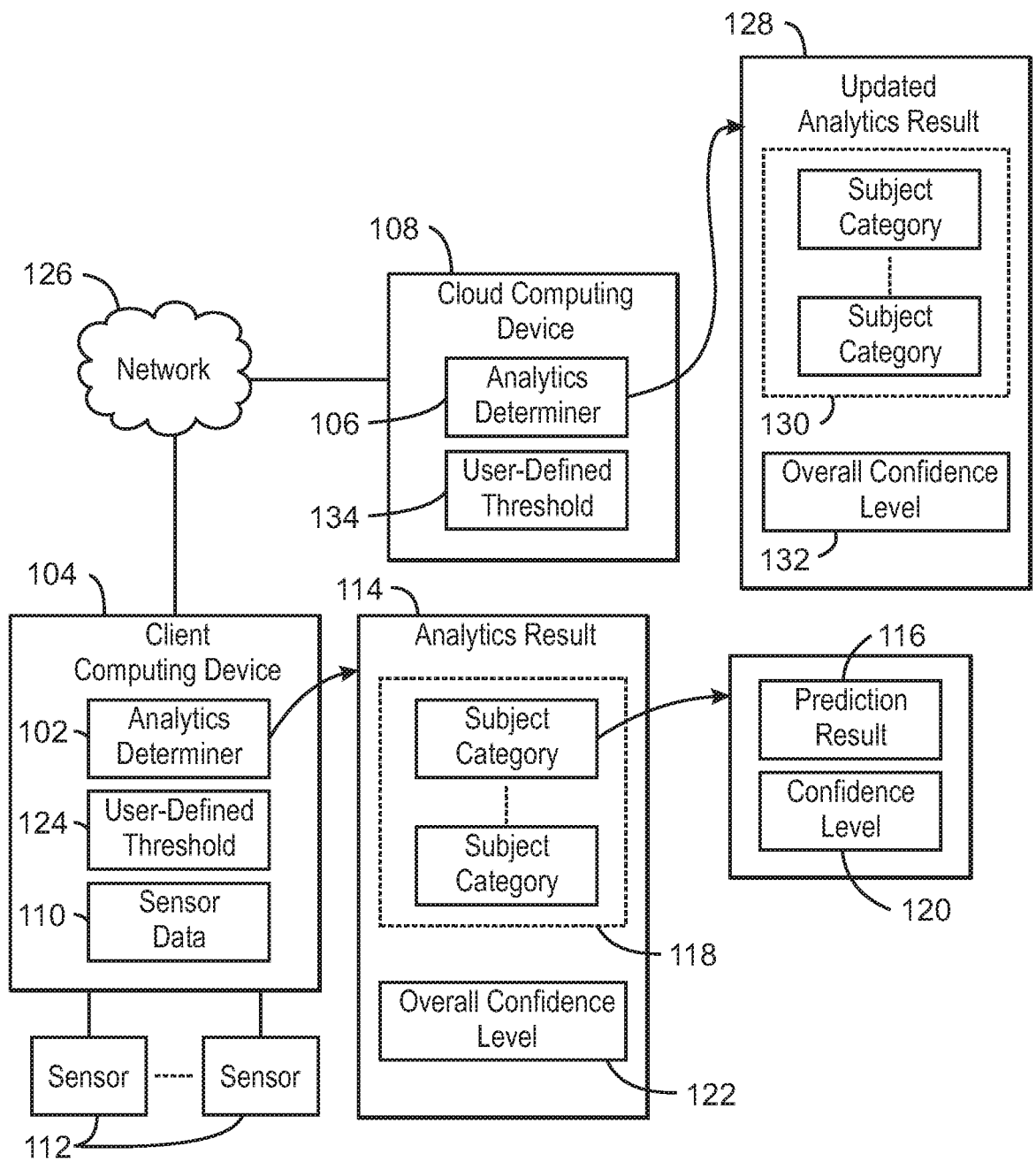
FIG. 1 is a block diagram of a perceptual computing analytics system.

Perceptual computing, voice analytics, anonymous video analytics (AVA), and image analytics (e.g., face detection, gender detection, age group detection, emotion recognition, pose recognition, gaze tracking, voice recognition, etc.) may be performed by a client computing device. The client computing device may be a personal computing device, an IoT device such as a smart sensor, an IoT cloud server, or an edge device such as a gateway device, aggregation device, fog device, and so forth. Indeed, the client paradigm as discussed herein may relate to IoT edge devices such as gateways, nodes that are networked to then communicate with sensors that are not on the client device, and other IoT devices. Further, client method embodiments disclosed herein may be implemented on those IoT architectures.

In operation, the client computing device may acquire an image or video via a camera sensor of the client computing device, or an audio stream from a microphone sensor of the client computing device, and send the image, video, or audio stream to an analytics determiner (e.g., analytics engine) hosted on the client computing device. Analytics determiners may be designed, for example, using a supervised machine-learning algorithm that implements a set of prediction functions for a set of subject categories (e.g. age, gender, emotion, facial expression, pose, hand gesture, body part location, gaze, voice interpretation, sensor data mapping, etc.). A prediction function inputs a set of sensor data (e.g. image, video, 3D image, 3D video, voice, etc.) and outputs a prediction result for its subject category. The prediction result is assigned a confidence level, which is a probability of how closely the prediction result matches a set of training samples used to train the machine-learning algorithm. Generally, an analytics determiner may employ or be designed using a predictor function(s) that assigns a confidence level to prediction results of the analytics determiner. Analytics determiners, also referred to as analytics engines, may be designed using Intel® RealSense™ technology, Intel® Audience Impression Metrics (AIM) Suite, Microsoft Cortana®, Google Now™, Apple Siri®, and the like. Additional examples of analytics determiners implemented in the cloud or that use cloud-based computing are Microsoft Cognitive Services, Google Vision API, Amazon Web Services, and the like.

The analytics such as AVA and others may also be performed on a computing device in a cloud such as a service-provider cloud which may be external to a client IoT cloud. In operation, a client computing device may acquire an image or video via a camera sensor or an audio stream via a microphone sensor, for example, and send the data to a cloud-hosted analytics determiner for processing. Analytics results from the cloud-hosted analytics determiner may be stored in a database or sent back to the client computing device to initiate an action by the client computing device. For example, the actions initiated may include changing the media content of the client computing device, uploading a promotional coupon to a smartphone, alerting a sales representative, and so forth.

In some examples, a cloud-hosted analytics determiner may be more likely to have better prediction accuracy compared to a client-hosted analytics determiner (e.g., an analytics determiner executing on a client computing device) for at least two reasons. First, cloud computing devices (cloud servers) or cloud distributed computing systems may generally have more processing power compared to client computing devices and are therefore typically capable of implementing more holistic and complex analytics procedures. Second, in certain instances, analytics determiners on cloud computing devices may be trained using deep-learning neural networks with large sets of training data. Indeed, a cloud server may be more likely to employ machine learning. A cloud computing device may interact with multiple client computing devices. These interactions may provide for or improve machine learning of the cloud-hosted analytics determiner.

Despite the advantages mentioned above, cloud-hosted analytics generally consume network bandwidth and may have additional latency as compared to an analytics determiner on a client computing device. Cloud-hosted analytics may incur additional latencies because of the extra time taken to send image data from a client computing device to a cloud-hosted analytics determiner via a network. Extra time is also generally experienced in sending actionable items back to the client computing device. Hence, a cloud-hosted analytics determiner (e.g., an analytics determiner on a cloud computing device, cloud distributed computing system, etc.) may not be able to provide near real-time actionable item feedback to a client computing device. Furthermore, uninterrupted network bandwidth may be implemented for a cloud-hosted analytics determiner because the client computing device may constantly be sending images or data to the cloud-hosted analytics determiner via a network. In some instances, perceptual computing related sensor data, such as images and videos sent from a client computing device to a cloud-hosted analytics determiner, may entail large amounts of data and may consume significant amounts of network bandwidth. In contrast, a client-hosted analytics determiner's performance may be network bandwidth agnostic. Embodiments of the techniques described herein may improve the prediction accuracy of a client-hosted analytics determiner by invoking the assistance of a cloud-hosted analytics determiner without sacrificing the advantages (e.g., network bandwidth agnostic and near real-time actionable item feedback for analytics results) of an analytics determiner on a client computing device.

FIG. 1 is a perceptual computing analytics system 100 having an analytics determiner 102 on a client computing device 104 and an analytics determiner 106 on a cloud computing device 108. The analytics determiner 102 on the client computing device 104 may analyze a set of sensor data 110 (e.g., image, video, 3D image, 3D video, voice, etc.) acquired via one or more sensors 112 (e.g. camera, camera arrays, 2D image sensor, 3D image sensor, depth sensor, microphone, microphone arrays, etc.) coupled to or associated with the client computing device 104. The analytics determiner 102 may calculate an analytics result 114 from sensor data 110. The analytics result 114 may include a prediction result 116 for each of the analytics subject categories 118 (e.g., gender, age, emotion, pose, gaze, facial expression, speech etc.) and a calculated confidence level 120 associated with the prediction result 116 for the analytics subject categories 118. The analytics determiner 102 may average all or a subset of the respective confidence levels 120 for the subject categories 118 to give an overall confidence level 122. In some embodiments, the overall confidence level 122 may be a weighted-average confidence level based on weights assigned to the respective subject categories 118. In other embodiments, overall confidence level 122 may be a weighted-average confidence level of a subset (e.g., a user-defined subset) of analytics subject categories 118 based on the confidence levels 120 calculated for and assigned to the analytics subject categories 118 by the analytics determiner 102. For example, a user may select a subset of analytics subject categories 118 including gender and age and convey to the analytics determiner 102 that age is twice as important as gender. In turn, the analytics determiner 102 calculates a weighted-average confidence level. Generally, overall confidence level 122 may be calculated using any user-defined function that takes as input the confidence level 120 of one or more analytics subject categories 118. A user-defined threshold 124 also may be input to the analytics determiner 102. If the calculated overall confidence level 122 is above the user-defined threshold 124, the client computing device 104 may employ the perceptual computing analytics result 114 as calculated by the client-hosted analytics determiner 102. Consequently, client computing device 104 may invoke an action in response to analytics result 114. The help of the cloud-hosted analytics determiner 106 may thus not be invoked in some instances. On the other hand, if the overall confidence level 122 is below the user-defined threshold 124, the client-hosted analytics determiner 102 may send the sensor data 110 associated with the below confidence level analytics result 114 to a cloud-hosted analytics determiner 106 for analytics re-disposition. Examples of cloud-hosted analytics determiners include Microsoft® Cognitive Services, Google Cloud Vision API, Amazon Web Services™, proprietary cloud-hosted analytics engines, and so forth. The client computing device 104 hosting the analytics determiner 102 may communicate with the cloud computing device 108 and the analytics determiner 106 via a network 126.

The cloud computing device 108 via the analytics determiner 106 may process the sensor data 110 and send an updated analytics result 128 to the client computing device 104, which may initiate an action based on the updated analytics results 128. Updated analytics result 128 may include a new set of prediction results and their associated confidence levels (not shown) for a set of analytics subject categories 130 calculated by cloud-hosted analytics determiner 106. Analytics subject categories 130 of cloud-hosted analytics determiner 106 may be similar to the analytics subject categories 118 of client-hosted analytics determiner 102. However, in some embodiments, analytics subject categories 130 of cloud-hosted analytics determiner 106 may comprise a different set or subset of subject categories as compared to the analytics subject categories 118 of client-hosted analytics determiner 102. Updated analytics result 128 may also include a new overall confidence level 132 calculated by cloud-hosted analytics determiner 106. The procedures, equations, functions, weights, etc. for calculating the new overall confidence level 132 may be similar to those employed for calculating the overall confidence level 122 by client-hosted analytics determiner 102. On the other hand, the respective techniques for calculating overall confidence levels 122 and 132 may also differ. For example, cloud-hosted analytics determiner 106 may utilize a different set of subject categories 130 or a different weighted function to compute its overall confidence level 132. The analytics determiner 106 of the cloud computing device 108 also has a user-defined threshold 134 for the overall confidence level 132. User-defined threshold 134 of cloud-hosted analytics determiner 106 may be equal to the user-defined threshold 124 of client-hosted analytics determiner 102. However, in some embodiments, the user-defined threshold 134 of cloud-hosted analytics determiner 106 may also have a value that is different from the user-defined threshold 124 of client-hosted analytics determiner 102. Consequently, if the overall confidence level 132 associated with analytics result 128 is above the user-defined threshold 134, the analytics result 128 may be accepted by the client computing device 104 and the client computing device 104 may initiate an action based on the analytics results 128. On the other hand, if the overall confidence level 132 associated with analytics result 128 is below the user-defined threshold 134, the analytics result 128 may be ignored and no action is invoked by the client computing device 104. In some embodiments, sensor data 110 and its corresponding analytics result 128 which are below the overall confidence level 132 may be logged into a database for future disposition or analysis.

Certain embodiments may improve or supplement the overall prediction accuracy of client-hosted analytics determiners (e.g., client-hosted analytics engine implemented using Intel® RealSense™ technology or a client-hosted AVA engine) generally without sacrificing near real-time performance of actionable items fed back to the client computing device. The base performance of the client-hosted analytics determiner may remain the same in some examples, but the client-hosted analytics determiner may employ feedback from a cloud-hosted analytics determiner to improve decision-making. For example, all or most analytics results with high confidence levels (e.g., that exceed a threshold) may be accepted by the client computing device 104 and an action initiated in near real-time. However, analytics results with low confidence levels (e.g., below a threshold) that would have been assigned an "unknown" or "wrong" analytics result by the analytics determiner 102 can potentially be re-dispositioned with higher accuracy or "confidence level" because of the help of the cloud-hosted analytics determiner 106.

Furthermore, some embodiments may implement an analytics determiner 102 that is generally low-cost with relatively good prediction accuracy and near real-time performance of actionable items. Actionable items may be received by the client computing device 104 and the analytics determiner 102 and include those sent from the cloud analytics determiner 106. For instance, an independent software vendor (ISV) may implement his own AVA software procedure on a client computing device 104 and utilize the services of an external cloud analytics solution provider to overcome some of the prediction shortcomings of his client-based analytics procedure. Cloud analytics solution providers may require a customer to pay based on the number of inquiries made to their cloud-hosted analytics engine. Yet, the ISV may reduce costs by relying on the client-hosted analytics determiner 102 and supplementing the results obtained from the client-hosted analytics determiner 102 with inquiries for data that the ISV's own client-hosted analytics determiner 102 could not successfully disposition with high confidence levels.

Indeed, examples may divide the analytics processing workload between a client computing device and a cloud server. The techniques may facilitate a client computing device's utilization of part of its additional processing bandwidth to offload some of the analytics workload to the analytics determiner located on the cloud server.

Figure 2:
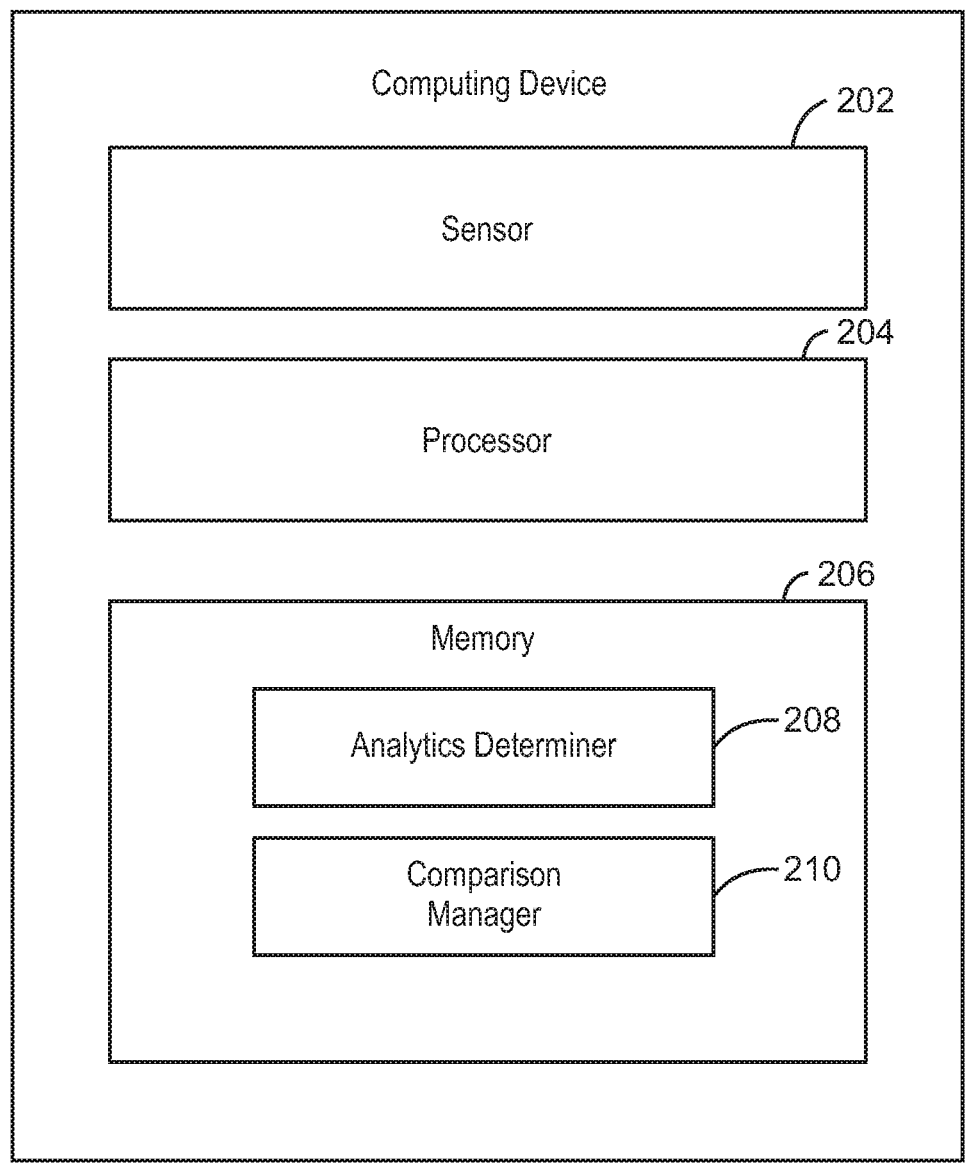
FIG. 2 is a block diagram of an embodiment of a client computing device configured for cloud-assisted perceptual computing analytics.

FIG. 2 is a block diagram of an embodiment of a client computing device 200 configured for cloud-assisted perceptual computing analytics. The client computing device 200 may include a sensor 202 to collect data for perceptual computing. The sensor 202 may collect data that includes biometrics, radio frequency identification (RFID), temperature, air quality, proximity, video, image, audio, light, and combinations thereof. The client computing device 200 may include a processor 204 that is configured to execute stored instructions, as well as memory 206 that stores instructions executable by the processor 204. The processor 204 may be more than one processor, and each processor may have more than one core. The processor 204 may be a single core processor, a multi-core processor, a computing cluster, or other configurations. The processor 204 may be a central processing unit (CPU), a general purpose graphics processing unit (GPGPU), a microprocessor, a processor emulated on programmable hardware (e.g. FPGA), or other type of hardware processor. The processor 204 may be implemented as a Complex Instruction Set Computer (CISC) processor, a Reduced Instruction Set Computer (RISC) processor, x86 Instruction set compatible processor, or other microprocessor or processor.

The memory 206 may be non-volatile memory and volatile memory. The non-volatile memory may include hard drive(s), solid state drive(s), read-only memory (ROM) (e.g., Mask ROM, PROM, EPROM, EEPROM, etc.), flash memory, and so forth. The volatile memory may include cache, random access memory (RAM) (e.g., SRAM, DRAM, zero capacitor RAM, SONOS, eDRAM, EDO RAM, DDR RAM, RRAM, PRAM, etc.), and other volatile memory. Other memory systems may be employed. The memory 206 can be used to store data and computer-readable instructions that, when executed by the processor 204, direct the processor 204 to perform various operations in accordance with embodiments described herein.

The memory 206 may store an analytics determiner 208. The analytics determiner 208 may be stored code (e.g., instructions, logic, etc.) executable by the processor 204 to calculate a disposition result based on the data collected by the sensor 202 and to calculate a confidence level of the disposition result.

The memory 206 may also store a comparison manager 210. The comparison manager 210 may be code executable by the processor 204 to compare the confidence level to a threshold and to send the data to a cloud computing device if the confidence level is below the threshold. In operation, if the confidence level is above the threshold, the comparison manager 210 may initiate an action by the client computing device 200 appropriate to the disposition result. In some examples, the analytics determiner 208 may incorporate the comparison manager 210.

As for the calculated confidence level, the confidence level may be a function of multiple confidence levels, each assigned by the client computing device 200 to the different analytics subject categories. As discussed, the function may be a weighted average of all or a user-defined subset of the plurality of confidence levels. The threshold may be a user-defined numerical value received by the client computing device 200.

The block diagram of FIG. 2 is not intended to indicate that the client computing device 200 is to include all of the components shown in FIG. 2. Rather, the client computing device 200 can include fewer or additional components not shown in FIG. 2, depending on the details of the specific implementation. Furthermore, any of the functionalities of the processor 204 may be partially, or entirely, implemented in hardware and/or a processor. For example, the functionality may be implemented in any combination of Application Specific Integrated Circuits (ASICs), Field Programmable Gate Arrays (FPGAs), logic circuits, and the like. In addition, embodiments of the present techniques can generally be implemented in electronic devices, including ultra-compact form factor devices, such as System-On-a-Chip (SOC), multi-chip modules, and other electronic devices.

Figure 3:
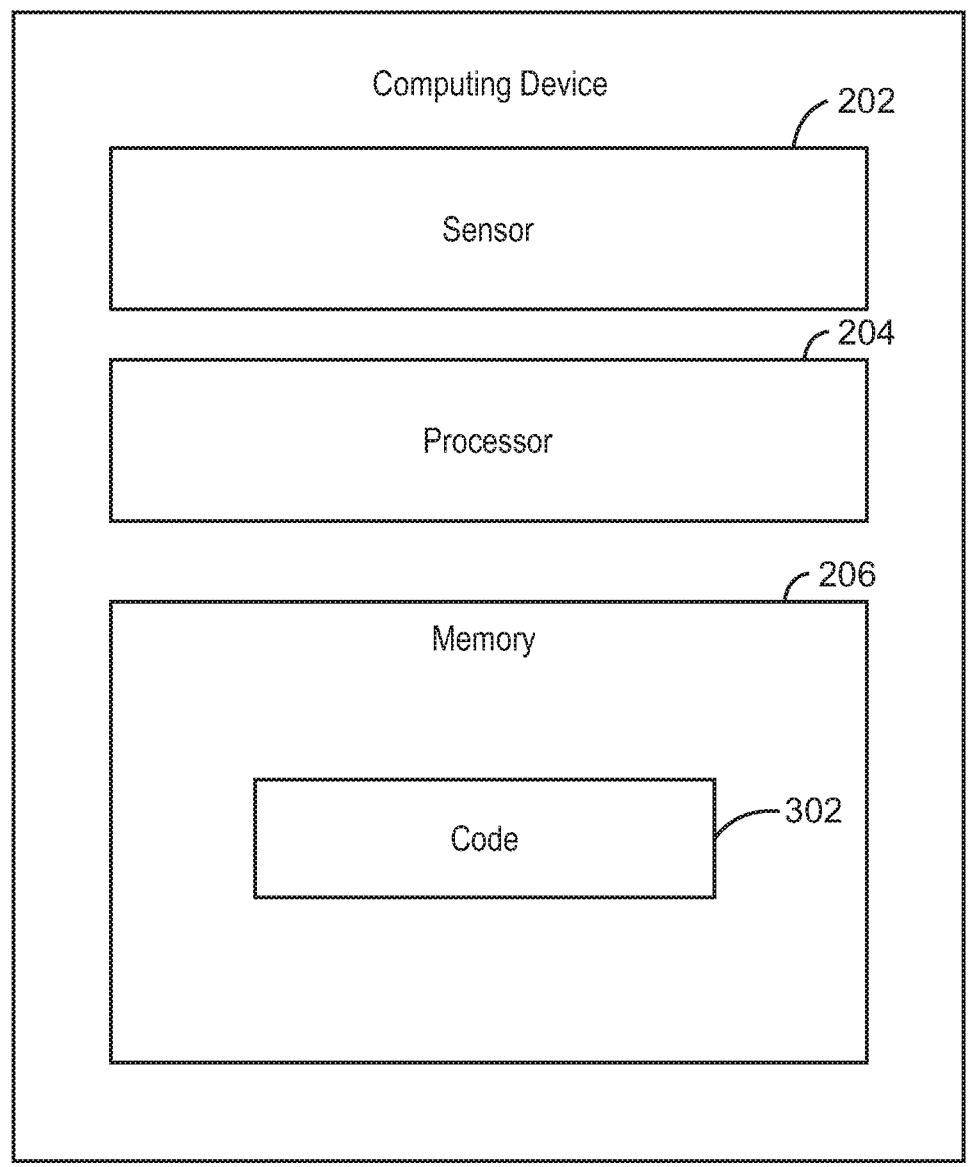
FIG. 3 is a block diagram of a client computing device configured for cloud-assisted perceptual computing analytics.

FIG. 3 is a block diagram of a client computing device 300 configured for cloud-assisted perceptual computing analytics. The client computing device 300 may include a sensor 202, a processor 204, and memory 206. The memory 206 may store code 302 (e.g., instructions, logic, etc.) executable by the processor 204. The code 302 may include instructions to: calculate a disposition result based on the data collected by the sensor 202, calculate a confidence level of the disposition result, compare the confidence level to a threshold, and send the sensor data to a cloud computing device in response to the confidence level not satisfying (e.g., being below) the threshold. As discussed, the confidence level may be an average confidence level including a weighted-average confidence level based on different subject categories of the perceptual computing.

As discussed with respect to FIG. 1, the cloud computing device (not shown in FIG. 3) may also include a processor and memory storing executable code. The code stored in the memory of the cloud computing device may include instructions to calculate a disposition result based on the sensor data received from the client computing device, calculate a confidence level of the disposition result, compare the confidence level to a threshold (which may be the same or different than the threshold associated with the client computing device), and initiate an action to be implemented by the client computing device in response to the cloud-calculated confidence level satisfying (e.g., being above) the threshold employed by the cloud computing device. Moreover, the disposition result determined by the cloud computing device may be improved or more accurate than that calculated by the client computing device. Lastly, in response to the cloud confidence level not satisfying the cloud threshold, no action may be invoked by the client computing device 104 in response to the updated analytics result 128 from cloud-hosted analytics determiner 106. However, other suitable actions may be taken by the cloud computing device 108 such as logging the below confidence level analytics results and its associated sensor data 110 in a database for future disposition or analysis.

Figure 4:
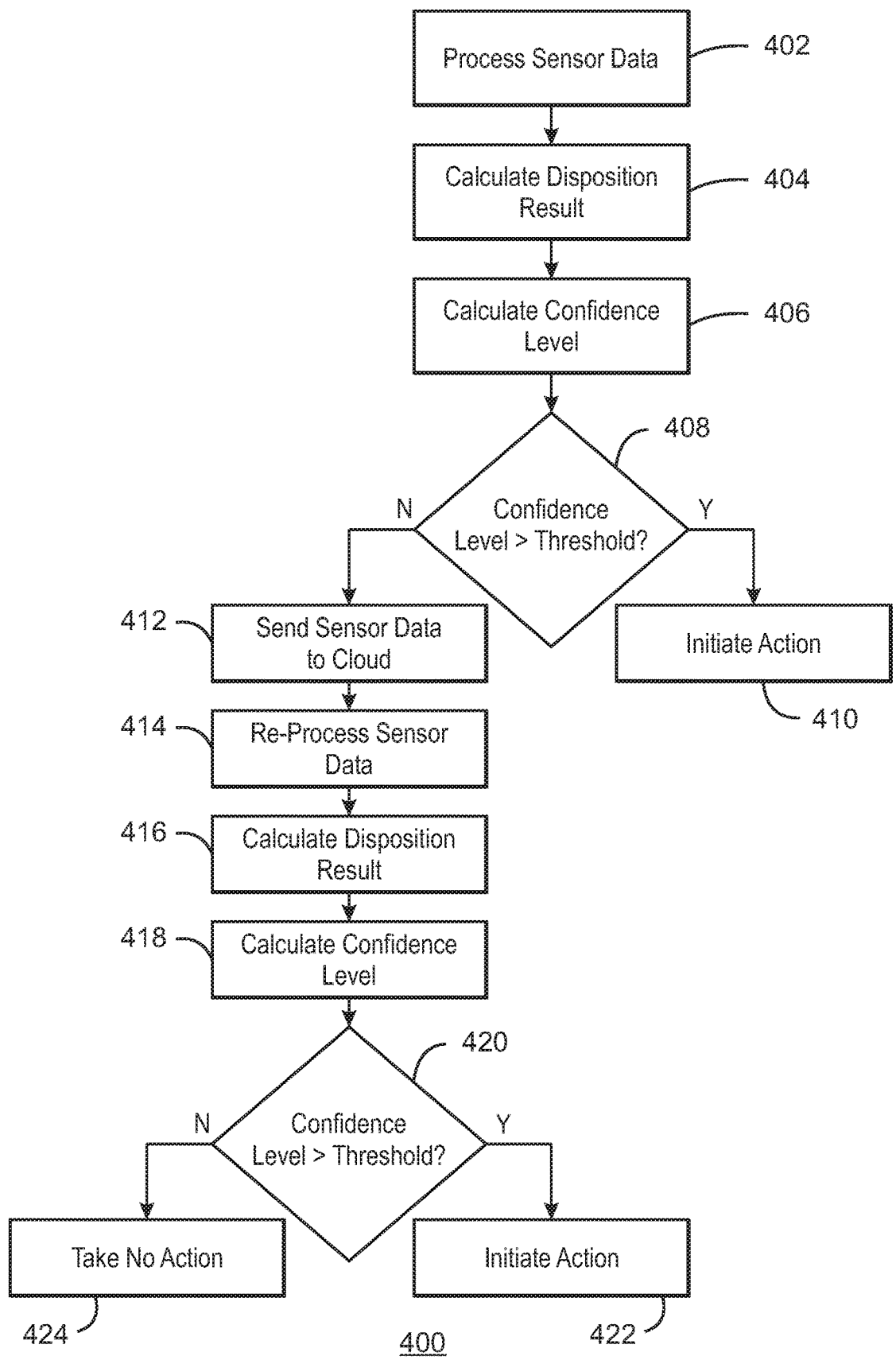
FIG. 4 is a flow diagram of a method for cloud-assisted perceptual computing analytics.

FIG. 4 is a flow diagram of a method 400 for cloud-assisted perceptual computing analytics. A client computing device (e.g., including a sensor platform/gateway, a digital sign with AVA, a digital security surveillance system, etc.) may capture data with its sensor(s) (e.g., an Intel® RealSense™ camera sensor, a webcam sensor, etc.). At block 402, the client-hosted analytics determiner processes the sensor data. This may be accomplished, for example, by passing the sensor data as inputs to a set of predictor functions of the client-hosted analytics determiner 102. Predictor functions of client-hosted analytics determiner 102 may be pre-trained using a supervised machine learning procedure on a set of representative training examples with pre-dispositioned results (e.g. a set of images pre-dispositioned as examples of the male and female genders). Training the predictor functions may involve, for example, inputting the training examples to the predictor functions to obtain a set of prediction results, comparing the prediction results to the pre-dispositioned results of the training examples, and calculating a prediction error defining a measured difference between the prediction results and the pre-dispositioned results. Fine tuning of a set of variables of the predictor functions use, for example, a gradient descent method, such that a subsequent iteration of the training process will produce a new set of prediction results with marginally smaller prediction errors. This training process may be repeated until the prediction results of the predictor functions converge toward the pre-dispositioned results of the training examples and the prediction error converges to a local minima. The predictor functions are considered substantially trained and may be used to make predictions from other data inputs beyond its representative training examples.

At block 404, the client-hosted analytics determiner calculates a disposition result based on a set of analytics subject categories (e.g., emotion, gender, age, gaze, pose, etc.) and assigns a prediction result to each of the analytics subject categories. At block 406, the client-hosted analytics determiner may calculate a confidence level for each subject category. This may be accomplished, for example, by calculating a prediction error for the prediction result for each analytics subject category and mapping the prediction error onto a confidence level scale. A prediction value with a relatively high prediction error will be assigned a low confidence level, and vice versa. For example, the client-hosted analytics determiner may calculate that there is a 75% confidence level that the detected emotion is "happy." As an additional example, the client-hosted analytics determiner may calculate that there is a 55% confidence level that the detected person's age is between 25 and 35. The confidence level may be calculated as a weighted average of the confidence levels of all or a user-defined subset of the subject categories.

At block 408 (a decision or comparison block), a computing device (e.g., the client computing device) compares the confidence level to a threshold such as a user-defined threshold. In response to the confidence level being above the threshold, the results may be accepted by the client computing device which may initiate an action, as indicated at block 410. Actions taken by the client computing device are commensurate with the analytics results. For example, the actions initiated may include changing the media content of the client computing device, uploading a promotional coupon to a smartphone, or alerting a sales representative.

If the confidence level is below the threshold as determined by the comparison at block 408, the method 400 progresses to block 412 where the client-hosted analytics determiner may send the sensor data for analysis to a cloud computing device having an analytics determiner for perceptual computing (e.g., a cloud-hosted analytics determiner). The client-hosted analytics determiner and the cloud-hosted analytics determiner may communicate with each other via a network. The network may be, for example, a local area network (LAN) or a wide area network (WAN).

At block 414, the cloud-hosted analytics determiner may process the sensor data (re-process in that the processing is in addition to the processing of the sensor data by the client computing device). At block 416, the cloud-hosted analytics determiner may calculate a disposition result based on the processed sensor data and a set of analytics subject categories. In certain examples, the disposition result calculated in the cloud may be more reliable or more accurate than the disposition result calculated by the client computing device. At block 418, the cloud-hosted analytics determiner may calculate a confidence level for each subject category. In embodiments, the cloud-hosted analytics determiner may calculate confidence levels for its analytic results based on a set of analytics subject categories that correspond to the subject categories of the client-based analytics determiner. In other words, the cloud-hosted analytics determiner calculates confidence levels for the same subject categories as does the client-hosted analytics determiner.

At block 420, the confidence level of the re-dispositioned analytics results determined by the cloud computing device may be compared to a threshold. (The analytics results are re-dispositioned in that the dispositioning in the cloud is in addition to the dispositioning performed by the client computing device.) The threshold may be the same as or different than the threshold used by the client-hosted analytics determiner. If the confidence level of the re-dispositioned analytics results is above the threshold, the client computing device may initiate an action at block 422 in response to the analytics results of the cloud-hosted analytics determiner. In embodiments, the confidence level calculated by the cloud-hosted analytics determiner may be higher or substantially higher than the confidence level previously calculated by the client-hosted analytics determiner. If the confidence level calculated by the cloud-hosted analytics determiner is below the threshold at block 420, the response may be that no action is taken in some instances, as indicated by block 424, because of the uncertainty of the analytics results. However, in other instances, the method 400 may learn from the uncertainty or make corrections or changes to applications and devices (on cloud computing devices, client computing devices, other computing devices, etc.) in response to the uncertainty and below-threshold calculated confidence levels.

The method 400 may be employed to analyze combinations of other types of sensor data including radio-frequency identification (RFID), temperature, air quality, proximity, light, biometrics, and the like. Furthermore, the method 400 is generally applicable to any client-hosted analytics determiner that attaches a confidence level or a prediction error to its analytical results and utilizes a companion cloud-hosted analytics determiner to enhance the accuracy of its analytics results.

Figure 5:
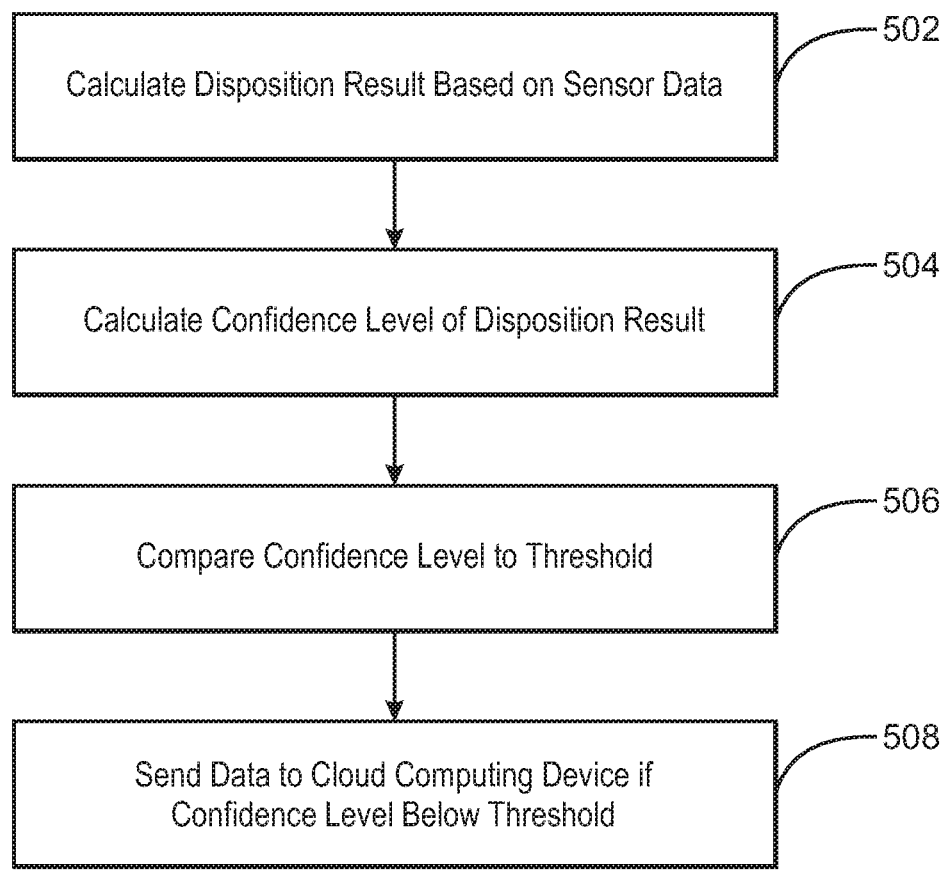
FIG. 5 is a flow diagram of a method analogous to the method shown in FIG. 4.

FIG. 5 is a flow diagram of the method 500 which may be analogous to the method 400 shown in FIG. 4. A client computing device may capture data with its sensors. The data may be differing types of data that can be captured by different types of sensors. The sensor data may be processed by the client-hosted analytics determiner. At block 502, the client-hosted analytics determiner may calculate a disposition result based on a set of analytics subject categories. At block 504, the client-hosted analytics determiner may calculate a confidence level for each subject category. The confidence level may be a numerical value calculated via an equation or a function. For example, the function may be a weighted average of the confidence levels of a user-defined subset of analytics results calculated by the client-hosted analytics determiner.

At block 506, the confidence level may be compared to a threshold. The threshold may be a numerical value supplied to the analytics determiner by a user. At block 508, the sensor data may be sent to a cloud computing device in response to the confidence level being below the threshold. If the confidence level is above the threshold, an action may be initiated by the client computing device. For example, if a person is viewing a digital sign in a store promoting a product, the action may be that AVA sensors embedded in the digital sign send data to the client-hosted analytics determiner. In a particular example, the analytics determiner may determine that there is an 85% confidence level that the person viewing the sign is happy. If the user-defined threshold is 80%, the analytics determiner may initiate an action by the client computing device. In this case, the action may be alerting a sales representative that the person viewing the digital sign is interested in the product promoted by the sign. As an additional example, a person may be viewing a website for a product on his smartphone. The product may be designed for the age group 25 to 35. Sensors contained in the smartphone may send data to the client-hosted analytics determiner. The analytics determiner may determine that there is an 80% confidence level that the detected person is between the ages of 25 and 35. If the user-defined threshold is 70%, the analytics determiner may upload a promotional coupon for the product to the smartphone. In a further example, a person may be talking to an intelligent personal assistant on a smartphone or laptop requesting the personal assistant to complete a certain task, for example, play a video or perform an online search. Sensors contained in the smartphone or laptop may send the user's voice data to a client-hosted analytics determiner for voice recognition processing. The analytics determiner may determine that there is a 70% confidence level that the detected voice data may be translated to a command to play a video ABC. If the user-defined threshold for the client-hosted analytics determiner is 75%, the analytics determiner may send the voice data to a cloud-hosted analytics determiner via a network for re-disposition. The cloud-hosted analytics determiner re-processes the data and may determine that there is a 90% confidence level that the voice data may be translated to a command to play video XYZ. If the user-defined threshold for the cloud-hosted analytics determiner is 80%, then the cloud-hosted analytics determiner may invoke the client-hosted analytics determiner to play video XYZ. Alternatively, the cloud-hosted analytics determiner may send the updated analytics result to the client-hosted analytics determiner. Subsequently, the client-hosted analytics determiner may inspect the updated analytics result and play video XYZ. In another example, a person may be walking on the premises of a retail store and AVA sensors in the store may send data to an analytics determiner. In particular, the analytics determiner may determine that there is an 85% confidence level that the person detected by the AVA sensors is a female and a 75% confidence level that her age is between 25 and 35 years. If the user-defined threshold is 80%, and the weighted function for computing an overall weighted confidence level indicates that gender is twice as important as age, the analytics determiner may store the AVA analytics result in a database. However, if the weighted function for computing the overall weighted confidence level was configured to indicate that age is twice as important as gender, the analytics determiner may send the sensor data to a cloud-hosted AVA analytics determiner for re-disposition and the updated AVA results may be stored in the database. Other examples and configurations are applicable.

Figure 6:
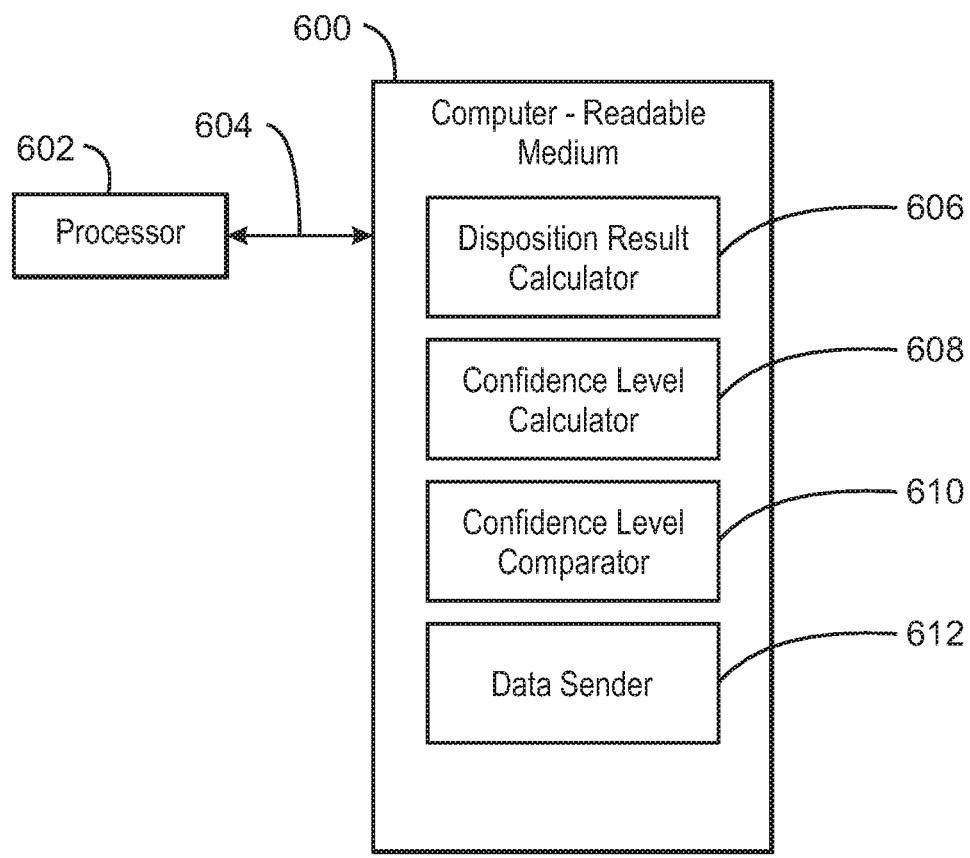
FIG. 6 is a block diagram of a medium containing code to execute cloud-assisted perceptual computing.

FIG. 6 is a block diagram of a medium 600 containing code to execute cloud-assisted perceptual computing. The medium 600 may be a non-transitory computer-readable medium that stores code that can be accessed by a processor 602 via a bus 604. For example, the computer-readable medium 600 can be a volatile or non-volatile data storage device. The medium 600 can also be a logic unit, such as an ASIC, a FPGA, or an arrangement of logic gates implemented in one or more integrated circuits, for example.

The medium 600 may include modules 606-612 configured to perform the techniques described herein. For example, a disposition result calculator 606 may be configured to calculate a disposition result based on sensor data. A confidence level calculator 608 may be configured to calculate a confidence level for the disposition result. A confidence level comparator 610 may be configured to compare the confidence level to a user-supplied threshold. A data sender 612 may be configured to send the sensor data to a cloud computing device if the confidence level is below the threshold. In some embodiments, the modules 606-612 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

As mentioned, a client computing device may be an IoT device such as a gateway device, edge device, aggregation device, smart sensor, IoT cloud computing system (e.g., server or distributed computing system), and the like. The gateway device, edge device, aggregation device, fog device, and so on may collect data from IoT smart sensors and send the sensor data to an IoT cloud computing network. One or more of the IoT devices including the smart sensors, edge device, gateway device, aggregation device, and IoT cloud computing system may have a client analytics determiner, and be in communication with another cloud (external cloud) computing system having a cloud analytics determiner as discussed above.

Figure 7:
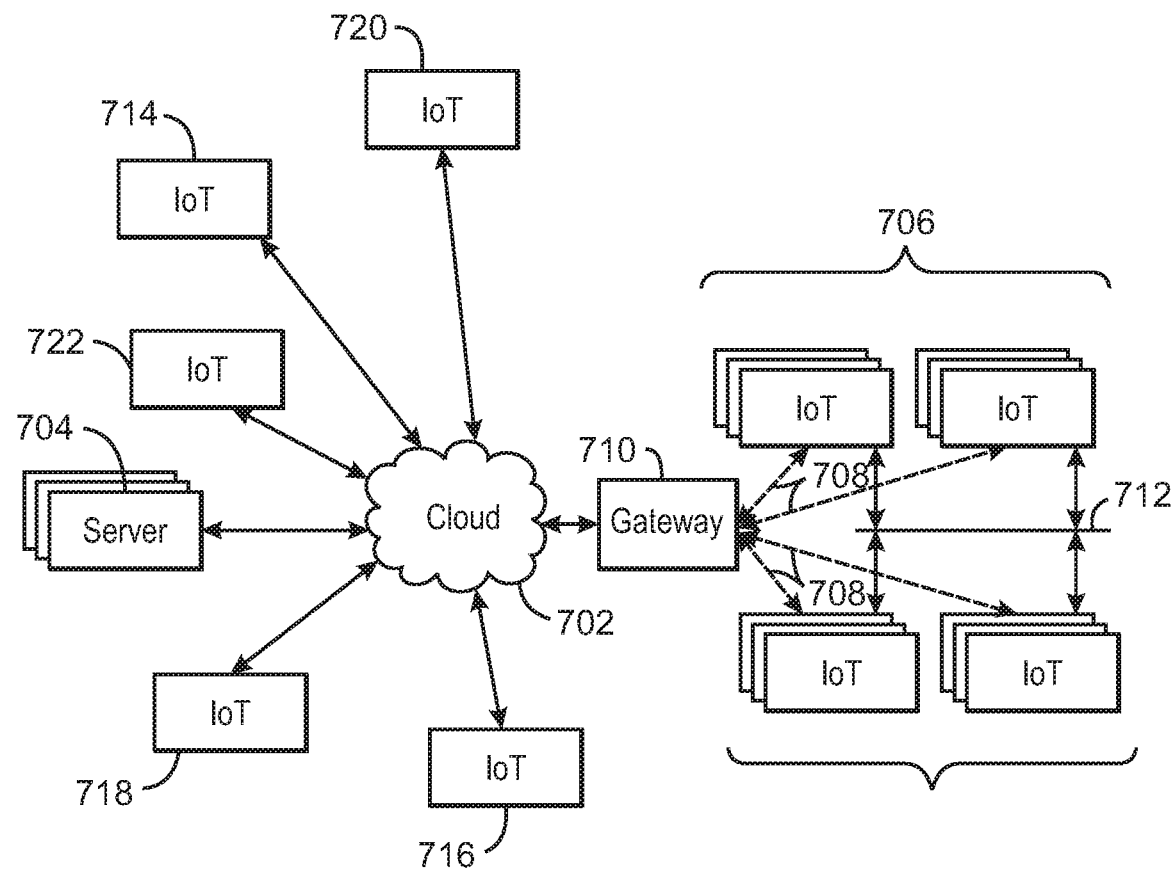
FIG. 7 is a drawing of an IoT system including a cloud computing network, or cloud, in communication with a number of Internet of Things devices.

FIG. 7 is an IoT system 700 including a cloud computing network, or cloud 702, in communication with a number of Internet of Things devices. The IoT system 702 may be a client system. The cloud 702 may represent the Internet, or may be a local area network (LAN), or a wide area network (WAN), such as a proprietary network for a company. The IoT devices may include any number of different types of devices, grouped in various combinations. For example, a store group 706 may include IoT devices such as proximity sensors to determine if a customer is in the proximity of a digital sign placed in the store. The store group 706, or other subgroups, may be in communication with the cloud 702 through wireless links 708, such as LPWA links, and the like. Further, a wired or wireless sub-network 712 may allow the IoT devices to communicate with each other, such as through a local area network, a wireless local area network, and the like. The IoT devices may use another device, such as a gateway 710, to communicate with the cloud 702.

Other groups of IoT devices may include a gaze tracking sensor 714, facial expression sensor 716, gender sensor 718, age sensor 720, alerting mechanism 722, among many others. Each of these IoT devices may be in communication with other IoT devices, with servers 704, or both. Of course, the IoT system 700 may include sensors urelated to perceptual computing and suitable for other applications.

As can be seen from FIG. 7, a large number of IoT devices may be communicating through the cloud 702. This may allow different IoT devices to provide information autonomously. For example, the store group 706 may indicate that a person is in the proximity of a digital sign without human intervention. Further, the gaze tracking sensor 714 may indicate that the customer is gazing at the sign. The facial expression sensor 716 may establish that the customer is interested in the content of the sign. The gender sensor 718 may establish that the customer is a female and the age sensor 720 may indicate that the customer is between the ages of 25 and 35. If the product advertised by the sign is designed for women 25 to 35 years of age, the alerting mechanism 722 may alert a sales representative that a customer of the appropriate age and gender is interested in the product advertised by the sign. The sensors mentioned provide their data for alerting a sales representative as long as the overall confidence level for the subject category, e.g., proximity, gaze, facial expression, etc., exceeds the user-defined threshold.

Clusters of IoT devices, such as the alerting mechanism 722 and the store group 706, may be equipped to communicate with other IoT devices as well as with the cloud 702. This may allow the IoT devices to form an ad-hoc network between the devices, allowing them to function as a single device, which may be termed a fog device. This is discussed further with respect to FIG. 8.

Figure 8:
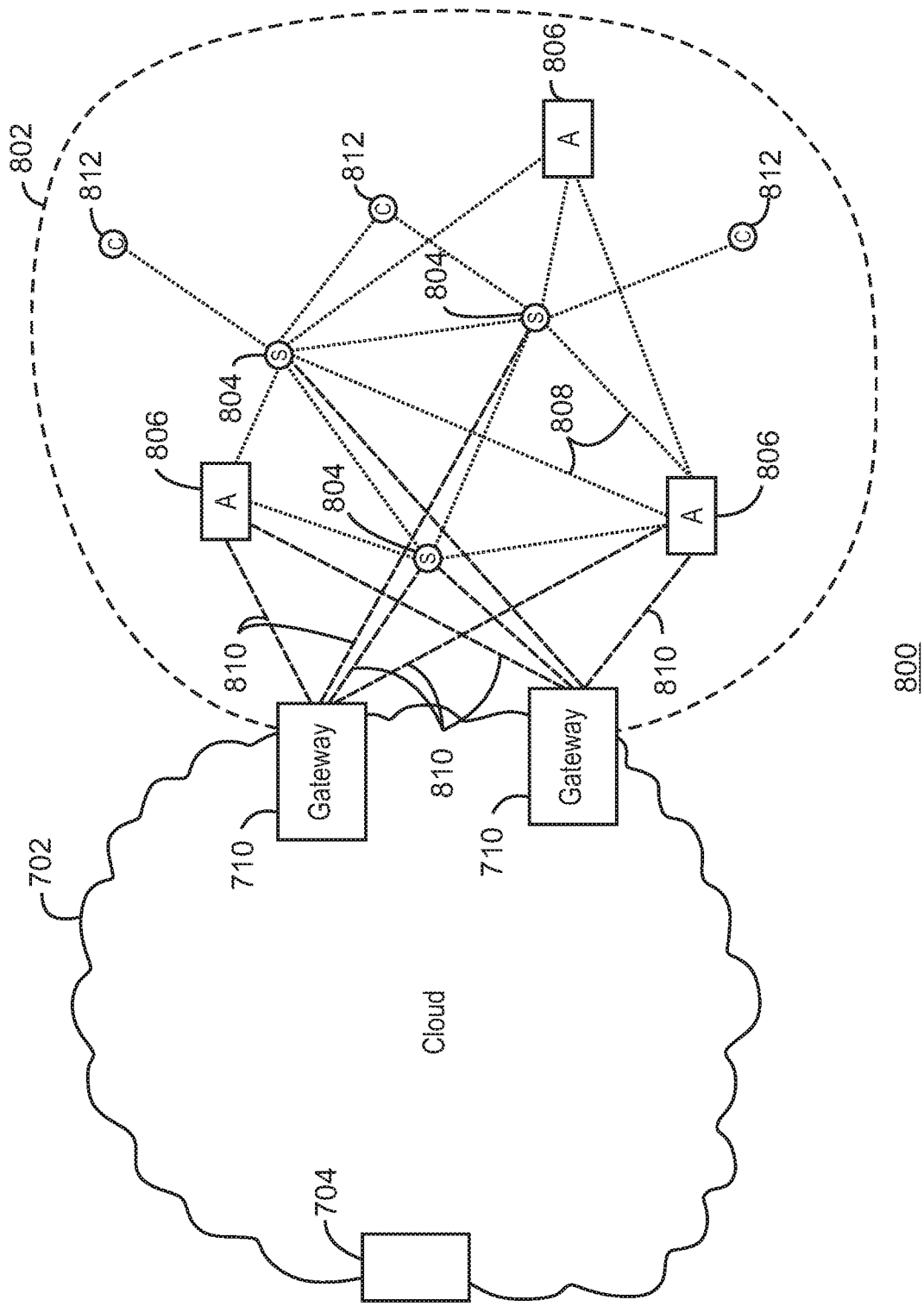
FIG. 8 is a drawing of a cloud computing network, or cloud, in communication with a mesh network of IoT devices, which may be termed a fog device, operating at the edge of the cloud.

FIG. 8 is a drawing 800 of a cloud computing network, or cloud 702, in communication with a mesh network of IoT devices, which may be termed a fog device 802, operating at the edge of the cloud 702. Like numbered items are as described with respect to FIG. 7. In this example, the fog device 802 is a group of IoT devices in a store. The fog device 802 may be established in accordance with specifications released by the OpenFog Consortium (OFC), among others. These specifications allow the formation of a hierarchy of computing elements between the gateways 710 coupling the fog device 802 to the cloud 702 and to endpoint devices, such as alerting mechanisms and data aggregators 806 in this example. It can be noted that the fog device 802 leverages the combined processing and network resources that the collective of IoT devices provides. Accordingly, a fog device 802 may be used for any number of applications including, for example, financial modeling, weather forecasting, traffic analyses, and the like.

The interest of a customer in merchandise advertised by a sign is determined by the three sensors 804 for proximity, gaze tracking, and facial expression. Analysis of the data from the sensors may be implemented by aggregators 806 that are in communication with the sensors 804 and each other through a mesh network. Sensor data may be uploaded to the cloud 702, and a determination of interest in the sign may be received from the cloud 702, through gateways 710 that are in communication with the sensors 804 and the aggregators 806 through the mesh network.

Any number of communications links may be used in the fog device 802. Shorter-range links 808, for example, compatible with IEEE 802.15.4 may provide local communications between IoT devices that are proximate to the store. Longer-range links 810, for example, compatible with LPWA standards, may provide communications between the IoT devices and the gateways 710. To simplify the diagram, not every communication link 808 or 810 is labeled with a reference number.

The fog device 802 may be considered to be a massively interconnected network wherein a number of IoT devices are in communications with each other, for example, by the communication links 808 and 810. The network may be established using the open interconnect consortium (OIO) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

Communications from any IoT device may be passed along the most convenient path between any of the IoT devices to reach the gateways 710. In these networks, the number of interconnections provides substantial redundancy, allowing communications to be maintained, even with the loss of a number of IoT devices.

Some of the elements in the drawing 800 may not be members of the fog device 802. In the drawing 800, three customers 812 are not part of the fog device 802, but their interest in a sign is determined by the sensors 804.

The fog device 802 may be presented to a cloud computing device, such as the server 704, as a single device located at the edge of the cloud 702. In this example, the communications to specific resources in the fog device 802 may occur without identifying any specific IoT device within the fog device 802. Accordingly, if an IoT device fails, other IoT devices may be able to discover a resource. For example, the sensors 804 may be wired so as to allow one of the sensors 804 to determine proximity of a customer to a sign should the proximity sensor fail.

In some examples, the IoT devices may be configured using an imperative programming style, e.g., with each IoT device having a specific function and communication partners. However, the IoT devices forming the fog device 802 may be configured in a declarative programming style, allowing the IoT devices to reconfigure their operations and communications, such as to determine needed resources in response to conditions, queries, and device failures. This may be performed as transient IoT devices, such as an alerting mechanism, join the fog device 802.

As the transient devices leave the vicinity of the fog device 802, it may reconfigure itself to eliminate those IoT devices from the network. As other transient IoT devices approach the fog device 802, it may reconfigure itself to include those devices.

The fog device 802 may include sensors 804 for a number of signs in the store, along with all of the transient IoT devices, i.e., alerting mechanisms, in the store. The fog device 802 may then divide itself into functional units, such as the sensors 804 and other IoT devices proximate to a single sign. This type of combination may enable the formation of larger IoT constructs in the fog device 802.

As illustrated by the fog device 802, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 9:
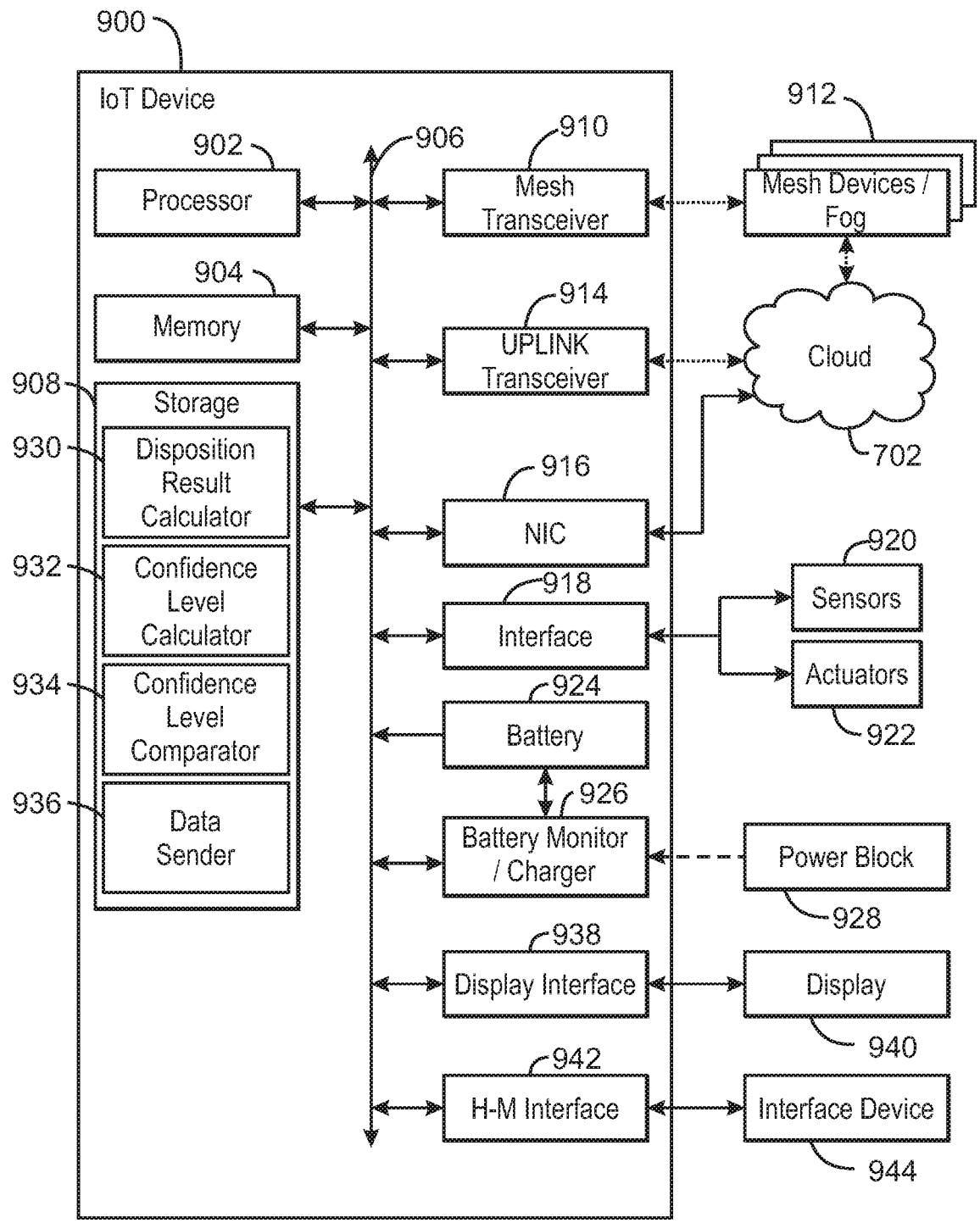
FIG. 9 is a block diagram of an example of components that may be present in an IoT device for perceptual computing.

FIG. 9 is a block diagram of an example of components that may be present in an IoT device 900 for perceptual computing. The IoT device 900 may be a client device and may include any combination of the components shown in the example. The components may be implemented as ICs, portions thereof, discrete electronic devices, or other modules, logic, hardware, software, firmware, or a combination thereof adapted in the IoT device 900, or as components otherwise incorporated within a chassis of a larger system. The block diagram of FIG. 9 is intended to show a high level view of components of the IoT device 900. However, some of the components shown may be omitted, additional components may be present, and different arrangements of the components shown may occur in other implementations.

The IoT device 900 may include a processor 902, which may be a microprocessor, a multi-core processor, a multi-threaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also couple to the processor 902 via the bus 906. To enable a thinner and lighter system design the mass storage 908 may be implemented via a solid state drive (SSD). Other devices that may be used for the mass storage 908 include flash memory cards, such as SD cards, microSD cards, xD picture cards, and the like, and USB flash drives. In low power implementations, the mass storage 908 may be on-die memory or registers associated with the processor 902. However, in some examples, the mass storage 908 may be implemented using a micro hard disk drive (HDD). Further, any number of new technologies may be used for the mass storage 908 in addition to, or instead of, the technologies described, such as resistance change memories, phase change memories, holographic memories, or chemical memories, among others. For example, the IoT device 900 may incorporate the 3D XPOINT memories from Intel® and Micron®.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an I2C interface, I3C interface, an SPI interface, point to point interfaces, and a power bus, among others.

The bus 906 may couple the processor 902 to a mesh transceiver 910, for communications with other mesh devices 912. The mesh transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 912. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 910 may communicate using multiple standards or radios for communications at different ranges. For example, the IoT device 900 may communicate with close devices, e.g., within about 10 meters, using a local transceiver based on BLE, or another low power radio, to save power. More distant mesh devices 912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 910 may be incorporated into an MCU as an address directly accessible by the chip, such as in the Curie® units available from Intel.

An uplink transceiver 914 may be included to communicate with devices in the cloud 702. The uplink transceiver 914 may be an LPWA transceiver that follows the IEEE 802.15.4, IEEE 802.15.4g, IEEE 802.15.4e. IEEE 802.15.4k, or NB-IoT standards, among others. The IoT device 900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 910 and uplink transceiver 914, as described herein. For example, the radio transceivers 910 and 912 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 910 and 912 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as 3GPP Generic Access Network, or GAN standard), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 916 may be included to provide a wired communication to the cloud 702 or to other devices, such as the mesh devices 912. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 916 may be included to allow connection to a second network, for example, a NIC 916 providing communications to the cloud over Ethernet, and a second NIC 916 providing communications to other devices over another type of network.

The bus 906 may couple the processor 902 to an interface 918 that is used to connect external devices. The external devices may include sensors 920, such as proximity sensors, gaze tracking sensors, facial expression sensors, gender sensors, age sensors, and the like. The interface 918 may be used to connect the IoT device 900 to actuators 922, such as an alerting mechanism, an audible sound generator, a visual warning device, and the like.

While not shown, various input/output (I/O) devices may be present within, or connected to, the IoT device 900. For example, a display may be included to show information, such as sensor readings or actuator positions. An input device, such as a touch screen or keypad may be included to accept input.

Indeed, the IoT device 900 may have one or more I/O interfaces, such as a display interface 938 and a human-machine (HM) interface 942. The display interface 938 may accommodate video, as well as audio. In the illustrated example, a display 940 may be coupled to the display interface 938. The display 940 may provide for display of data including IoT data collected via IoT systems.

The display 940 may incorporate technologies such as liquid crystal display (LCD), light emitting diodes (LEDs), organic LEDs (OLEDs), gas-plasma, and so forth. The display 940 can be a simple display or a more complex display. The display 940 may be an interactive display and accommodate user input. In some examples, the display 940 may have a touch screen for user input. The display 940 may have knobs or push buttons, and be configured with virtual icons, selectable or multi-touch menus, a graphical user interface (GUI), and so forth.

Further, an interface device 944 may be coupled to the HM interface (HMI) 942. The interface device 944 may include a touchscreen, mouse, keyboard, buttons, and the like. The HM interface 942 may include hardware and code to accommodate human interaction and input.

Moreover, while the display 940 and the interface device 944 are depicted as coupled to or part of the IoT device 900, displays and interface devices may also be coupled to or associated with various nodes and other devices throughout IoT systems for the display of IoT data and for human interaction. Indeed, displays or input devices, or both, may be present or connected with nodes and devices such as in the IoT system 700 of FIG. 7 or with devices illustrated in FIG. 8, and so on.

A battery 924 may power the IoT device 900, although in examples in which the IoT device 900 is mounted in a fixed location, it may have a power supply coupled to an electrical grid. The battery 924 may be a lithium ion battery, a metal-air battery, such as a zinc-air battery, an aluminum-air battery, a lithium-air battery, a hybrid super-capacitor, and the like.

A battery monitor/charger 926 may be included in the IoT device 900 to track the state of charge (SoCh) of the battery 924. The battery monitor/charger 926 may be used to monitor other parameters of the battery 924 to provide failure predictions, such as the state of health (SoH) and the state of function (SoF) of the battery 924. The battery monitor/charger 926 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 926 may communicate the information on the battery 924 to the processor 902 over the bus 906. The battery monitor/charger 926 may also include an analog-to-digital (ADC) convertor that allows the processor 902 to directly monitor the voltage of the battery 926 or the current flow from the battery 924. The battery parameters may be used to determine actions that the IoT device 900 may perform, such as transmission frequency, mesh network operation, sensing frequency, and the like.

A power block 928, or other power supply coupled to a grid, may be coupled with the battery monitor/charger 926 to charge the battery 924. In some examples, the power block 928 may be replaced with a wireless power receiver to obtain the power wirelessly, for example, through a loop antenna in the IoT device 900. A wireless battery charging circuit, such as an LTC4020 chip from Linear Technologies of Milpitas, Calif., among others, may be included in the battery monitor/charger 926. The specific charging circuits chosen depend on the size of the battery 924, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 908 may include a number of modules to implement the functions described herein. Although shown as code blocks in the mass storage 908, it may be understood that any of the modules may be replaced with hardwired circuits, for example, built into an application specific integrated circuit (ASIC). The mass storage 908 may include a disposition result calculator 930 that processes the sensor data by calculating a disposition result based on a set of analytics subject categories (e.g., emotion, gender, age, gaze, pose, etc.) and by assigning a prediction result to each of the analytics subject categories.

A confidence level calculator 932 may be included to calculate a confidence level for each subject category. This may be accomplished, for example, by calculating a prediction error for the prediction result for each analytics subject category and mapping the prediction error onto a confidence level scale. A prediction value with a relatively high prediction error will be assigned a low confidence level, and vice versa.

The confidence level calculated by the confidence level calculator 932 may be compared to a threshold by a confidence level comparator 934. The threshold may be a user-defined threshold. If the confidence level is below the threshold as determined by the confidence level comparator 934, a data sender 936 may send the sensor data for analysis to a cloud computing device having an analytics determiner for perceptual computing (e.g., a cloud-hosted analytics determiner).

Lastly, some embodiments of an analytics determiner (e.g., analytics engine, etc.) are now discussed. These embodiments may apply to the analytics determiners 102 and 106 of FIG. 1, the analytics determiner 208 of FIG. 2, an analytics determiner which may be installed on the cloud 702, server 704, or gateway 710 of FIG. 7 and FIG. 8, on the fog device 802 of FIG. 8, or on the computing device 900 of FIG. 9, and so forth. The analytics determiner, such as an analytics engine, can be made up of software elements programmable by the user, hardware elements of a fixed or configurable nature, or any combinations thereof.

For specific embodiments calling for fast and repetitive workload, as well as for other embodiments, the analytics determiner may include or employ fixed-function hardware such as hardware accelerators and associated hardware accelerator functions to increase execution speed of the analytics determiner. The hardware accelerators may include processors and instructions other than the standard processor (e.g., CPU).

For instance, the hardware accelerators may include graphical processing units (GPUs), 3D accelerators, AI accelerators, cryptographic accelerators, other co-processors, processing instruction sets, and so on. An AI accelerator may be a class of microprocessor and associated instructions designed to accelerate machine learning procedures or algorithms for the IoT and other data-intensive or sensor-driven tasks, such as cloud-assisted perceptual analytics. Again, hardware acceleration may be beneficial for repetitive and intensive procedures, as well as for other actions.

The analytics determiner or analytics engine may include or employ fixed-functions implemented on FPGAs, fixed-functions implemented on ASICs, and so forth. FPGAs may be reconfigured by a manufacturer, designer, or user to perform a different function or different functions at different times associated with perceptual computing and the analytics.

The analytics determiner and associated systems may also include or employ a dedicated serial data interface (SDI), high definition SDI (HD-SDI), or network function virtualization (NFV), and the like, to enhance performance and accuracy of the analytics determiner or analytics engine. SDI is a family of digital video interfaces. As for NFV, a virtualized network function may consist of one or more virtual machines (VMs) or emulation of a computer system. In NFV, the VMs may run different software and processes, on top of high-volume servers, switches, storage devices, or cloud computing infrastructures, and so on.

In sum, embodiments of the analytics determiner or analytics engine may be software, hardware, or both. The software and hardware may be programmable or configurable by the user, or fixed-function, and so forth. For example, configurable hardware may be the aforementioned FPGA and other hardware. Another example of a technique to enhance performance and accuracy of the analytics determiner may be the aforementioned NFV, and the like.

A variety of arrangements can be architected for or associated with the analytics determiner. Moreover, as the analytics determiner or engine may be on various levels of or distributed across a distributed compute arrangement, the implementations of the analytics determiner or engine may be dictated at least in part by the underlying architecture chosen by the system designer.

Examples

Example 1 is a computing device for cloud-assisted perceptual computing analytics. The computing device includes a sensor to collect data for perceptual computing; an analytics determiner to: calculate a disposition result based on the data collected by the sensor; and calculate a confidence level of the disposition result; and a comparison manager to: compare the confidence level to a threshold; and send the data to a cloud computing device in response to the confidence level being below the threshold.

Example 2 includes the computing device of example 1, including or excluding optional features. In this example, the computing device includes a processor, wherein the computing device comprises an Internet of Things (IoT) device, wherein the analytics determiner comprises code stored in memory of the computing device and executable by the processor, and wherein the computing device comprises a client computing device external to a cloud comprising the cloud computing device.

Example 3 includes the computing device of any one of examples 1 to 2, including or excluding optional features. In this example, the computing device includes a processor, wherein the computing device comprises a client computing device comprising an IoT network server, an IoT gateway device, or an IoT smart sensor, wherein the comparison manager comprises code stored in memory of the computing device and executable by the processor, and wherein the client computing device to communicate with the cloud computing device via a network comprising a local area network or a wide area network, or both.

Example 4 includes the computing device of any one of examples 1 to 3, including or excluding optional features. In this example, the computing device comprises an IoT edge device or a node to communicate with other sensors not comprising the first sensor, and wherein the threshold comprises a numerical value specified by a user.

Example 5 includes the computing device of any one of examples 1 to 4, including or excluding optional features. In this example, the confidence level is a function of multiple confidence levels assigned by the computing device respectively to analytics subject categories. Optionally, the function is a weighted average of a user-defined subset of the multiple confidence levels assigned by the computing device respectively to the analytics subject categories.

Example 6 includes the computing device of any one of examples 1 to 5, including or excluding optional features. In this example, the computing device to initiate an action by the computing device in response to the confidence level being above the threshold.

Example 7 includes the computing device of any one of examples 1 to 6, including or excluding optional features. In this example, to calculate a disposition result comprises determining a prediction result for an analytics subject category for the data collected by the sensor. Optionally, the confidence level comprises a probability that the prediction result for the analytics subject category matches a pre-dispositioned result for the analytics subject category.

Example 8 is a computing device for cloud-assisted perceptual computing analytics. The computing device includes a sensor to collect data for perceptual computing; a first processor; and a first memory storing a first code executable by the first processor to: calculate a first disposition result based on the data collected by the sensor; calculate a first confidence level of the first disposition result; compare the first confidence level to a first threshold; and send the data to a cloud computing device in response to the first confidence level being below the first threshold.

Example 9 includes the computing device of example 8, including or excluding optional features. In this example, the computing device comprises a client computing device comprising an IoT edge device.

Example 10 includes the computing device of any one of examples 8 to 9, including or excluding optional features. In this example, the first threshold comprises a numerical value specified by a user, and wherein the first confidence level is a function of multiple confidence levels assigned by the computing device respectively to analytics subject categories. Optionally, the function is a weighted average of a user-defined subset of the multiple confidence levels assigned by the computing device respectively to the analytics subject categories.

Example 11 includes the computing device of any one of examples 8 to 10, including or excluding optional features. In this example, the first memory stores code executable by the first processor to initiate an action by the computing device in response to the first confidence level being above the first threshold.

Example 12 includes the computing device of any one of examples 8 to 11, including or excluding optional features. In this example, the cloud computing device comprises: a second processor; and a second memory storing a second code executable by the second processor to: calculate a second disposition result based on the data received from the computing device; calculate a second confidence level of the second disposition result; compare the second confidence level to a second threshold; and initiate an action by the computing device in response to the second confidence level being above the second threshold.

Example 13 includes the computing device of any one of examples 8 to 12, including or excluding optional features. In this example, the computing device comprises an Internet of Things (IoT) device, the IoT device comprising a gateway or an aggregation device.

Example 14 is a method by a computing device for cloud-assisted perceptual computing analytics. The method includes calculating a disposition result based on data collected by a sensor; calculating a confidence level of the disposition result; comparing the confidence level to a threshold; and sending the data to a cloud computing device in response to the confidence level being below the threshold.

Example 15 includes the method of example 14, including or excluding optional features. In this example, the computing device is a client computing device comprising an IoT edge device.

Example 16 includes the method of any one of examples 14 to 15, including or excluding optional features. In this example, the method includes receiving a value of the threshold from a user, wherein the confidence level is a function of multiple confidence levels calculated and assigned respectively by the computing device to analytics subject categories. Optionally, the function comprises a weighted average of a user-defined subset of the multiple confidence levels assigned respectively by the computing device to the analytics subject categories.

Example 17 includes the method of any one of examples 14 to 16, including or excluding optional features. In this example, the method includes initiating an action by the computing device in response to the confidence level being above the threshold.

Example 18 includes the method of any one of examples 14 to 17, including or excluding optional features. In this example, the method includes communicating with the cloud computing device via a network, wherein the network comprises a local area network or a wide area network, or both.

Example 19 is at least one computer-readable medium. The computer-readable medium includes instructions that direct a processor to calculate a disposition result based on data collected by a sensor; calculate a confidence level of the disposition result; compare the confidence level to a threshold; and send the data to a cloud computing device in response to the confidence level being below the threshold.

Example 20 includes the computer-readable medium of example 19, including or excluding optional features. In this example, the computer-readable medium includes instructions to direct the processor to receive a value of the threshold from a user.

Example 21 includes the computer-readable medium of any one of examples 19 to 20, including or excluding optional features. In this example, the computer-readable medium includes instructions to direct the processor to initiate an action in response to the confidence level being above the threshold.

Example 22 includes the computer-readable medium of any one of examples 19 to 21, including or excluding optional features. In this example, the computer-readable medium includes instructions to direct the processor to communicate with the cloud via a local area network or a wide area network, or both.

Example 23 is an apparatus for cloud-assisted perceptual computing analytics. The apparatus includes a means for calculating a disposition result based on data collected by a sensor; a means for calculating a confidence level of the disposition result; a means for comparing the confidence level to a threshold; and a means for sending the data to a cloud computing device in response to the confidence level being below the threshold.

Example 24 includes the apparatus of example 23, including or excluding optional features. In this example, the apparatus is a client computing device comprising an IoT edge device.

Example 25 includes the apparatus of any one of examples 23 to 24, including or excluding optional features. In this example, the apparatus includes a means for receiving a value of the threshold from a user and a means for initiating an action by the apparatus in response to the confidence level being above the threshold.

Example 26 includes the apparatus of any one of examples 23 to 25, including or excluding optional features. In this example, the apparatus includes a means for communicating with the cloud computing device. Optionally, the means for communicating with the cloud computing device comprises a local area network or a wide area network, or both.

Example 27 is a mobile device capable of cloud-assisted perceptual computing analytics. The device a sensor to collect data for perceptual computing; an analytics determiner to: calculate a disposition result based on the data collected by the sensor; and calculate a confidence level of the disposition result; and a comparison manager to: compare the confidence level to a threshold; and send the data to a cloud computing device in response to the confidence level being below the threshold.

Example 28 includes the device of example 27, including or excluding optional features. In this example, the device includes a processor, wherein the mobile computing device comprises an Internet of Things (IoT) device, wherein the analytics determiner comprises code stored in memory of the mobile computing device and executable by the processor.

Example 29 includes the device of any one of examples 27 to 28, including or excluding optional features. In this example, the mobile computing device comprises a client computing device external to a cloud comprising the cloud computing device.

Example 30 includes the device of any one of examples 27 to 29, including or excluding optional features. In this example, the device includes a processor, wherein the mobile computing device comprises a client computing device comprising an IoT network server, an IoT gateway device, or an IoT smart sensor, wherein the comparison manager comprises code stored in memory of the mobile computing device and executable by the processor, wherein the client computing device to communicate with the cloud computing device via a network comprising a local area network or a wide area network, or both.

Example 31 includes the device of any one of examples 27 to 30, including or excluding optional features. In this example, the mobile computing device comprises an IoT edge device or a node to communicate with other sensors not comprising the first sensor.

Example 32 includes the device of any one of examples 27 to 31, including or excluding optional features. In this example, the threshold comprises a numerical value specified by a user.

Example 33 includes the device of any one of examples 27 to 32, including or excluding optional features. In this example, the confidence level is a function of multiple confidence levels assigned by the mobile computing device respectively to analytics subject categories. Optionally, the analytics subject categories comprise gender, age, emotion, pose, gaze, and facial expression. Optionally, the function is a weighted average of a user-defined subset of the multiple confidence levels assigned by the mobile computing device respectively to the analytics subject categories.

Example 34 includes the device of any one of examples 27 to 33, including or excluding optional features. In this example, the mobile computing device to initiate an action by the mobile computing device in response to the confidence level being above the threshold.

Example 35 includes the device of any one of examples 27 to 34, including or excluding optional features. In this example, calculating a disposition result comprises determining a prediction result for an analytics subject category for the data collected by the sensor. Optionally, the confidence level comprises a probability that the prediction result for the analytics subject category marches a pre-dispositioned result for the analytics subject category.

Example 36 is a mobile device capable of cloud-assisted perceptual computing analytics. The device includes a sensor to collect data for perceptual computing; a first processor; and a first memory storing a first code executable by the first processor to: calculate a first disposition result based on the data collected by the sensor; calculate a first confidence level of the first disposition result; compare the first confidence level to a first threshold; and send the data to a cloud computing device in response to the first confidence level being below the first threshold.

Example 37 includes the device of example 36, including or excluding optional features. In this example, the mobile computing device comprises a client computing device comprising an IoT edge device.

Example 38 includes the device of any one of examples 36 to 37, including or excluding optional features. In this example, the first confidence level is a function of multiple confidence levels assigned by the mobile computing device respectively to analytics subject categories. Optionally, the first threshold comprises a numerical value specified by a user, and wherein the function is a weighted average of a user-defined subset of the multiple confidence levels assigned by the mobile computing device respectively to the analytics subject categories.

Example 39 includes the device of any one of examples 36 to 38, including or excluding optional features. In this example, the first memory stores code executable by the first processor to initiate an action by the mobile computing device in response to the first confidence level being above the first threshold.

Example 40 includes the device of any one of examples 36 to 39, including or excluding optional features. In this example, the cloud computing device comprises: a second processor; and a second memory storing a second code executable by the second processor to: calculate a second disposition result based on the data received from the mobile computing device; calculate a second confidence level of the second disposition result; compare the second confidence level to a second threshold; and initiate an action by the mobile computing device in response to the second confidence level being above the second threshold.

Example 41 includes the device of any one of examples 36 to 40, including or excluding optional features. In this example, the mobile computing device comprises an IoT device, the IoT device comprising a gateway or an aggregation device.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and; or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device comprising:
one or more sensor to collect data for perceptual computing;
a processor; and
storage to store instructions to direct the processor to:
calculate an analytics disposition result based on the data collected by the one or more sensor, wherein the analytics disposition result includes a respective calculated prediction result for each of a plurality of analytics subject categories;
calculate a respective confidence level associated with the prediction result for each of the plurality of analytics subject categories;
determine an overall confidence level based on the calculated confidence level for one or more of the analytics subject categories;
compare the overall confidence level to a threshold; and
send the data to a cloud computing device in response to the overall confidence level being below the threshold.

2. The computing device of claim 1, wherein the computing device comprises an Internet-of-Things (IoT) device, and wherein the computing device comprises a client computing device external to a cloud comprising the cloud computing device.

3. The computing device of claim 1, wherein the computing device comprises a client computing device comprising an IoT network server, an IoT gateway device, or an IoT smart sensor, wherein the client computing device to communicate with the cloud computing device via a network comprising a local area network or a wide area network, or both.

4. The computing device of claim 1, wherein the computing device comprises an IoT edge device or a node to communicate with other sensors not comprising the first sensor, and wherein the threshold comprises a numerical value specified by a user.

5. The computing device of claim 1, wherein the overall confidence level is a function of multiple confidence levels assigned by the computing device respectively to the analytics subject categories.

6. The computing device of claim 5, wherein the function is a weighted average of a user-defined subset of the multiple confidence levels assigned by the computing device respectively to the analytics subject categories.

7. The computing device of claim 1, wherein the computing device to initiate an action by the computing device in response to the overall confidence level being above the threshold.

8. The computing device of claim 1, wherein to calculate an analytics disposition result comprises determining a prediction result for an analytics subject category for the data collected by the sensor.

9. The computing device of claim 8, wherein each confidence level comprises a probability that the prediction result for the analytics subject category matches a predispositioned result for the analytics subject category.

10. The computing device of claim 1, the instructions to direct the processor to receive a new overall confidence level calculated by the cloud computing device.

11. The computing device of claim 1, wherein the analytics subject categories include one or more of gender, age, emotion, pose, gaze, facial expression, speech, and/or proximity.

12. A computing device comprising:
one or more sensor to collect data for perceptual computing;
a first processor; and
a first memory storing a first code executable by the first processor to:
calculate a first analytics disposition result based on the data collected by the one or more sensor, wherein the first analytics disposition result includes a respective calculated first prediction result for each of a plurality of analytics subject categories;
calculate a respective first confidence level associated with the first prediction result for each of the plurality of analytics subject categories;
determine a first overall confidence level based on the calculated first confidence level for one or more of the analytics subject categories;
compare the first overall confidence level to a first threshold; and
send the data to a cloud computing device in response to the first overall confidence level being below the first threshold.

13. The computing device of claim 12, wherein the computing device comprises a client computing device comprising an IoT edge device.

14. The computing device of claim 12, wherein the first threshold comprises a numerical value specified by a user, and wherein the first overall confidence level is a function of multiple confidence levels assigned by the computing device respectively to the analytics subject categories.

15. The computing device of claim 14, wherein the function is a weighted average of a user-defined subset of the multiple confidence levels assigned by the computing device respectively to the analytics subject categories.

16. The computing device of claim 12, wherein the first memory stores code executable by the first processor to initiate an action by the computing device in response to the first overall confidence level being above the first threshold.

17. The computing device of claim 12, wherein the cloud computing device comprises:

a second processor; and a second memory storing a second code executable by the second processor to:

calculate a second analytics disposition result based on the data received from the computing device, wherein the second analytics disposition result includes a respective calculated second prediction result for each of the plurality of analytics subject categories;

calculate a respective second confidence level associated with the second prediction result for each of the plurality of analytics subject categories;

determine a second overall confidence level based on the calculated second confidence level for one or more of the analytics subject categories;

compare the second overall confidence level to a second threshold; and initiate an action by the computing device in response to the second overall confidence level being above the second threshold.

18. The computing device of claim 12, wherein the computing device comprises an Internet of Things (IoT) device, the IoT device comprising a gateway, an edge device, or an aggregation device.

19. The computing device of claim 12, the instructions to direct the processor to receive a new overall confidence level calculated by the cloud computing device.

20. The computing device of claim 12, wherein the analytics subject categories include one or more of gender, age, emotion, pose, gaze, facial expression, speech, and/or proximity.

21. A method by a computing device, comprising:

calculating an analytics disposition result based on data collected by one or more sensor, wherein the analytics disposition result includes a respective calculated prediction result for each of a plurality of analytics subject categories;

calculating a respective confidence level associated with the prediction result for each of the plurality of analytics subject categories;

determining an overall confidence level based on the calculated confidence level for one or more of the analytics subject categories;

comparing the overall confidence level to a threshold; and sending the data to a cloud computing device in response to the overall confidence level being below the threshold.

22. The method of claim 21, wherein the computing device is a client computing device comprising an IoT edge device.

23. The method of claim 21, comprising receiving a value of the threshold from a user, wherein the overall confidence level is a function of multiple confidence levels calculated and assigned respectively by the computing device to the analytics subject categories.

24. The method of claim 23, wherein the function comprises a weighted average of a user-defined subset of the multiple confidence levels assigned respectively by the computing device to the analytics subject categories.

25. The method of claim 21, comprising initiating an action by the computing device in response to the overall confidence level being above the threshold.

26. The method of claim 21, comprising communicating with the cloud computing device via a network, wherein the network comprises a local area network or a wide area network, or both.

27. The method of claim 21, comprising receiving a new overall confidence level calculated by the cloud computing device.

28. The method of claim 21, wherein the analytics subject categories include one or more of gender, age, emotion, pose, gaze, facial expression, speech, and/or proximity.

29. At least one non-transitory computer-readable medium, comprising instructions to direct a processor to:

calculate an analytics disposition result based on data collected by one or more sensor, wherein the analytics disposition result includes a respective calculated prediction result for each of a plurality of analytics subject categories;

calculate a respective confidence level associated with the prediction result for each of the plurality of analytics subject categories;

determine an overall confidence level based on the calculated confidence level for one or more of the analytics subject categories;

compare the overall confidence level to a threshold; and send the data to a cloud computing device in response to the overall confidence level being below the threshold.

30. The at least one computer-readable medium of claim 29, comprising instructions to direct the processor to receive a value of the threshold from a user.

31. The at least one computer-readable medium of claim 29, comprising instructions to direct the processor to initiate an action in response to the overall confidence level being above the threshold.

32. The at least one computer-readable medium of claim 29, comprising instructions to direct the processor to receive a new overall confidence level calculated by the cloud computing device.

33. The at least one computer-readable medium of claim 29, wherein the analytics subject categories include one or more of gender, age, emotion, pose, gaze, facial expression, speech, and/or proximity.

* * * * *